FIG.1

Jimmie S. Hogan
Robert L. Hogan
INVENTORS

June 9, 1964

J. S. HOGAN ETAL 3,136,935

COMMUTATORLESS D.C. MOTOR

Filed March 18, 1959

Jimmie S. Hogan
Robert L. Hogan

INVENTORS

June 9, 1964

J. S. HOGAN ETAL 3,136,935

COMMUTATORLESS D.C. MOTOR

Filed March 18, 1959

Jimmie S. Hogan
Robert L. Hogan

INVENTORS

June 9, 1964  J. S. HOGAN ETAL  3,136,935
COMMUTATORLESS D.C. MOTOR
Filed March 18, 1959  5 Sheets-Sheet 4

Jimmie S. Hogan
Robert L. Hogan
INVENTORS

Jimmie S. Hogan
Robert L. Hogan
INVENTORS

United States Patent Office 3,136,935
Patented June 9, 1964

3,136,935
COMMUTATORLESS D.C. MOTOR
Jimmie S. Hogan, 4501 Creekbend Drive, Houston, Tex., and Robert L. Hogan, Houston, Tex.; said Robert L. Hogan assignor to said Jimmie S. Hogan
Filed Mar. 18, 1959, Ser. No. 800,312
6 Claims. (Cl. 318—138)

The present invention relates to an electric motor and more particularly to a motor comprising a rotor operating inside of a coil and being operated by selectively induced electromagnetic forces of the coil.

More particularly still the invention relates to a commutatorless direct current motor with the driving current-carrier encircling the motor rotor so that the selectively induced electromagnetic forces of the driving current-carrier proceeds directly from the current-carrier to the rotor imparting motion thereto.

My copending application Serial No. 728,412, filed on April 14, 1958, and now abandoned, discloses a commutatorless D.C. motor with various electrical circuits and rotor magnetic pole arrangements. The invention of this instant utilizes the motor circuits of that application, as well as other circuits, but the motor is modified in such a way that the motor rotor is directly encircled by the coils, thus eliminating the need for coil cores or other magnetic conducting field structures.

At the present time, electric motors that are operated by the electromagnetic forces of a field coil use a coil with a magnetic conducting core or field structure to help carry and apply the coil electromagnetic forces to the armature. Such motor construction tends to decrease the operating efficiency for certain applications. The hysteresis of a magnetic conducting field coil core or structure tend to limit the rotor cycles as well as increase the operating temperature and decrease the operating efficiency of present day motor construction utilizing such structures. Motors as presently constructed are also limited in size as well as in the arrangement of the various components.

An object of the present invention is to provide a motor which overcomes many of the objections of present day motor constructions.

A further object of the present invention is to provide a motor construction which can be made much smaller than conventional present day motor construction.

Still a further object of the present invention is to provide a motor that will permit the rotation of the rotor shaft inside of the field coil in a plane that is perpendicular to the rotor rotational plane simultaneously with the operation of the motor.

Still a further object of the present invention is to provide a motor that is capable of operating the motor rotor at a greater speed of rotation.

Still a further object of the present invention is to provide a D.C. motor whereby the motor rotor can be utilized as a gyro with complete freedom about its axis.

Still a further object of the present invention is to provide a motor construction in which the components thereof may be arranged in any of a plurality of relationships relative to each other.

Still a further object of the present invention is to provide a motor generator construction.

Still a further object of the present invention is to increase the efficiency and longevity of motors by providing a construction which eliminates the use of commutators, driving coil cores, and other magnetic structures and components normally used in present day motor constructions.

Still a further object of the present invention is to provide an oscillating commutatorless D.C. motor operating inside of a selectively induced coil.

Still a further object of the present invention is to provide a commutatorless D.C. motor operating inside of a coil and being operated by selectively induced electromagnetic forces of the coil.

Other objects and advantages of the present invention will become more readily apparent from a consideration of the following description and drawings wherein.

Figure 1:
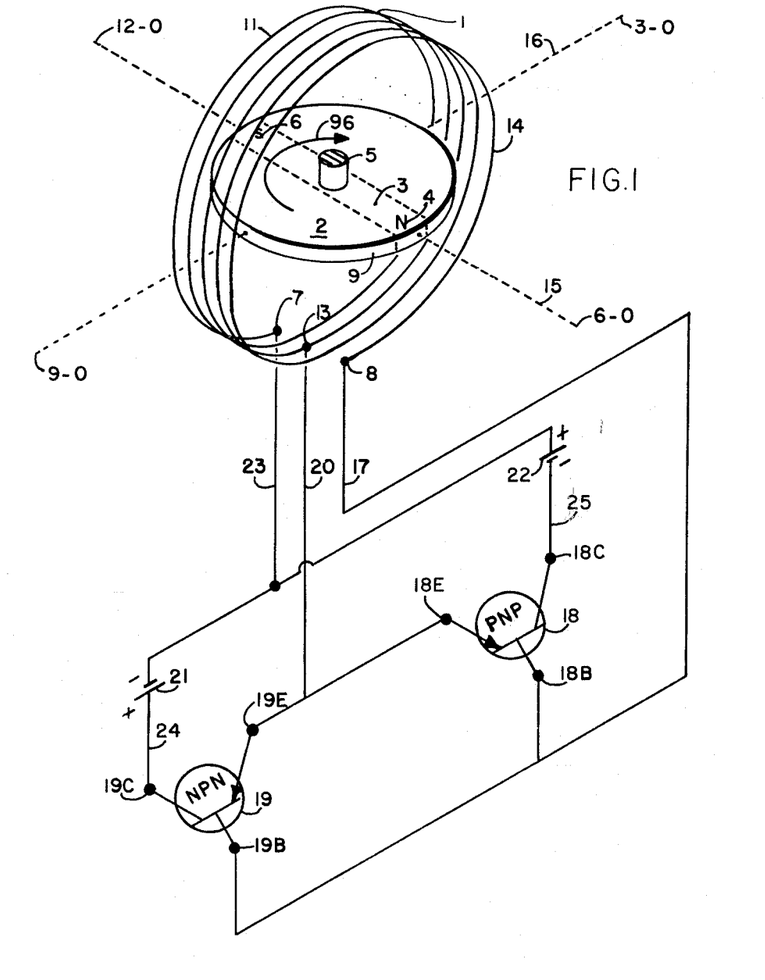
FIG. 1 is a schematic diagram illustrating a form of the invention illustrating a movable magnetized member encircled by a coil and one form of the circuit of the invention.

Attention is directed to FIG. 1 of the drawings wherein a permanently magnetized rotatable rotor or armature is illustrated at 2 and a driving means is shown at 1 which is magnetically coupled with the magnetized member 2 for imparting motion to the member 2.

More particularly, FIG. 1 schematically represents one modification of the present invention wherein the rotatable member 2 is permanently magnetized parallel to the rotor diameter along the diametrical band indicated at 3 and the rotor 2 consequently is provided with a north magnetic pole represented at 4 and a south magnetic pole represented at 6 on the rotor periphery face 9. The member 2 is rotatably supported by means of the shaft 5. The mounting for the rotatable member 2 is not shown in detail in FIG. 1, it being contemplated that suitable bearing means, as necessary, could be provided to support the member 2 for movement relative to the means 1.

As further shown in the modification of the invention shown in FIG. 1, the driving means 1 is being represented in the form of a coil with one of its ends represented at terminal 7 and the other end represented at terminal 8. The coil 1, which is center tapped at 13, concentrically encircles the rotor 2 in a plane that is perpendicular to the rotational plane of the rotor. With this arrangement of coil 1 encircling the rotor 2, the coil windings perpendicularly transverse face 9 of rotor 2. Line 15 represents the longitudinal center line of the coil and point 6–0 on center line 15 represents the side of the coil nearest the viewer of FIG. 1 or the 6 o'clock position of the rotor rotational plane. Point 12–0 on center line 15 represents the side of the coil farthest from the viewer or the 12 o'clock position of the rotor rotational plane. Line 16 represents the perpendicular center line of coil 1. Line 16 is also perpendicular to the axis of shaft 5 and the longitudinal center line 15. Points 3–0 and 9–0 on center line 16 respectively represent the 3 o'clock and 9 o'clock positions of the rotational plane of the rotor 2.

Semi-conductor 18 is provided with terminals 18B, 18C, and 18E and is qualified as being a semi-conductor such that when the negative terminal of a battery is connected to terminal 18C and the positive terminal of the battery connected to terminal 18E, the semi-conductor will not normally permit a flow of current therethrough unless terminal 18B is impressed with a more negative, or less positive, state, or voltage than terminal 18E. Semi-conductor 18 is being represented as a PNP transistor.

Semi-conductor 19 is provided with terminals 19B, 19C, and 19E and is qualified as being a semi-conductor such that when the positive terminal of a battery is connected to terminal 19C and the negative terminal of the battery is connected to terminal 19E, the semi-conductor will not normally permit a flow of current therethrough unless terminal 19B is impressed with a more positive, or less negative, state, or voltage than terminal 19E. Semi-conductor 19 is being represented as a NPN transistor.

Conductor 17 connects terminal 8 of coil 1 to the bases 18B and 19B of transistors 18 and 19.

Conductor 20 connects terminal 13, which is the center tap of coil 1, to the emitters 18E and 19E of transistors 18 and 19.

The source of electrical energy, being represented in the form of two batteries, is shown as battery 21 and battery 22 in FIG. 1. In actual practice, for this modification of the invention, the electrical source could be either one or several batteries, or any other source of direct current arranged to give the same effect as shown in FIG. 1.

As further shown in FIG. 1, conductor 23 connects terminal 7 of coil 1 to the negative terminal of battery 21 and to the positive terminal of battery 22.

Conductor 25 connects the negative terminal of battery 22 to the collector 18C of transistor 18.

Conductor 24 connects the positive terminal of battery 21 to the collector 19C of the transistor 19.

It is generally known in the electrical engineering field that with the current-carrying loops of a coil such as coil 1 (separate loops not numbered), we obtain a helix or solenoid that when energized is an electromagnet and a magnetic field is created both inside and outside of the solenoid with magnetic poles at the solenoid ends. The magnetic field of such energized solenoid passes through the inside of the solenoid, out one end, and continues back around and enters the opposite end of the solenoid, thus making a complete circuit.

It can be appreciated from the above discussions that the motor illustrated in FIG. 1 operates in the following manner.

If the rotor 2 is initially rotated in a clockwise direction as indicated by the arrow 96 with the north pole 4 starting from the 6 o'clock position on centerline 15 and proceeding toward the 9 o'clock and 12 o'clock positions, the electromagnetic force generated by this movement is such that terminal 8 of coil 1 is impressed with a more negative voltage and this voltage is conducted through conductor 17 to terminal 18B of transistor 18. The windings of coil 1 are such that this negative voltage impressed on terminal 18B is more negative than terminal 18E, thereby causing transistor 18 to become conductive.

For this first 180° of rotation, wherein the north pole 4 of the rotor rotates in a clockwise direction from the 6 o'clock position through the 9 o'clock position and to the 12 o'clock position, and whereby transistor 18 is caused to be conductive, current is allowed to flow from battery 22 through conductor 23 to terminal 7, through the first part of coil 1 and out center tap 13, through conductor 20 to terminal 18E, through transistor 18 to terminal 18C, and through conductor 25 to the negative terminal of battery 22. The magnetic field created inside of coil 1 by this current flow is such that a clockwise torque is imparted to the rotor. This condition will prevail as long as the rotor is rotating clockwise and the north pole 4 is at any point from the 6 o'clock position toward the 12 o'clock position and/or the south pole 6 is at any point from the 12 o'clock position toward the 6 o'clock position.

For the second 180° of rotation, wherein the north pole 4 of the rotor rotates in a clockwise direction from the 12 o'clock position through the 3 o'clock position and to the 6 o'clock position, a more positive voltage is impressed on terminal 8 and consequently also on terminals 18B and 19B. The more positive voltage impressed on terminal 18B causes transistor 18 to be non-conductive and thereby opens the circuit of conductor 25; however, the positive voltage impressed on 19B is more positive than 19E, thereby causing transistor 19 to become conductive.

When transistor 19 is conductive, a current is allowed to flow from the positive terminal of battery 21 through conductor 24 and to terminal 19C, through transistor 19 and to terminal 19E, through conductor 20 and to center tap 13, through half of coil 1 and to terminal 7, through conductor 23 and to the negative terminal of battery 21. It is noted that the direction of this current flow for this second 180° of rotation is in reverse to the current flow direction for the first 180° of rotation, therefore the magnetic field created inside of coil 1 is also reversed and a clockwise torque is still imparted to the rotor.

It can be appreciated that the electric signals received at terminal 8 of coil 1 and transmitted to terminals 18B and 19B cause transistors 18 and 19 to be alternately conductive and non-conductive, and therefore the direction of current flow through conductor 23 and the driving means is selectively reversed causing a continuous torque on rotor 2 in the direction of turn.

It can also be appreciated that the motor of FIG. 1 will operate equally well in a counter clockwise direction.

FIGS. 2, 3, 4, and 5 represent schematically various arrangements of the current-carrier 1 relative to the movable member 2. These drawings also help demonstrate the magnetic flux of the current-carriers for the different directions of current flows and the effects of this magnetic flux on the rotors.

Figure 2:
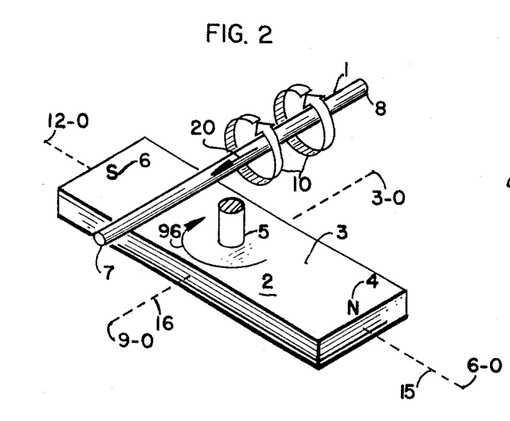
FIG. 2 illustrates one arrangement of the magnetized movable rotor relative to the current-carrier wherein the current-carrier is adjacent to one face of the rotor.

It should be appreciated that an infinite number of combinations of these arrangements could be provided without departing from the scope of the present invention. For example, in FIG. 2, the current-carrier 1 is schematically represented as being parallel to the rotational plane of the rotor 2 and being adjacent to only one face of the rotor. Current-carrier 1 is also represented as being a single conductor; however, in actual operation, the current-carrier 1 can be one or several conductors and thus can vary infinitely in size, shape, and number. Although current-carrier 1 shown in FIG. 2 is represented as being perpendicular to the axis of shaft 5, this motor will function with the current-carrier parallel to the axis of shaft 5 or in various interim positions.

The current-carrier 1 is a driving means, and the means for energizing the driving means shown in FIGS. 2, 3, 4, and 5 will be demonstrated separately later in these specifications.

The parts of rotors 2 represented in FIGS. 2, 3, 4, and 5 are numbered the same as those parts that have the same functions of the rotor 2 previously described in FIG. 1.

Center lines 15 and 16 with points 12–0, 3–0, 6–0, and 9–0 shown in FIGS. 2, 3, 4, and 5 are the same, relative to the respective rotors 2, as center lines 15 and 16 previously described in FIG. 1.

The current-carrier 1, shown in FIGS. 2, 3, 4, and 5, is being represented as a conductor with terminal ends 8 and 7.

In FIGS. 2, 3, 4, and 5, if terminal 8 is connected to the positive terminal of a battery and terminal 7 is connected to the negative terminal of the battery, a current will flow in the directions indicated by the arrows 20 and the magnetic flux caused thereby will be in the directions indicated by the arrows 10. This magnetic flux will reverse accordingly with a reversal of current flow.

In FIGS. 2, 3, 4, and 5, if the current flows in the direction indicated by the arrows 20 and the magnetic flux in the direction indicated by the arrows 10, the rotors 2 will tend to align themselves with this magnetic flux whereby the north pole face 4 will obtain the 6 o'clock position at point 6–0.

Attention is now directed exclusively to FIG. 2 of the drawings which represents one modification of the invention which operates in the following sequence.

If the rotor 2 be initially rotated in a clockwise direction 96 whereby the north pole face 4 moves from point 6–0 through point 9–0 and to point 12–0, and if the current is simultaneously caused to flow in a direction in reverse to that direction indicated by the arrow 20, the magnetic flux will flow in reverse to the direction indicated by the arrows 10 and accordingly a clockwise torque will be imparted from the current-carrier 1 to the rotor 2 for this first 180° of rotation. With this clockwise rotation, if the current is again reversed when the north pole face 4 reaches point 12–0, whereby the current flow is in the direction indicated by the arrow 20 and the magnetic flux in the direction of the arrows 10, a clockwise torque is still imparted from the current-carrier 1 to the rotor 2 for the second 180° of rotation.

It can thus be seen that if the direction of current flow in the driving means 1 be selectively reversed relative to the positions of the north pole face 4 and/or the south pole face 6, a clockwise torque will be imparted continuously to the rotor 2 and the cycles described above will continue to repeat.

It can also be seen that the rotor of FIG. 2 will operate equally well in a counter clockwise direction.

Figure 3:
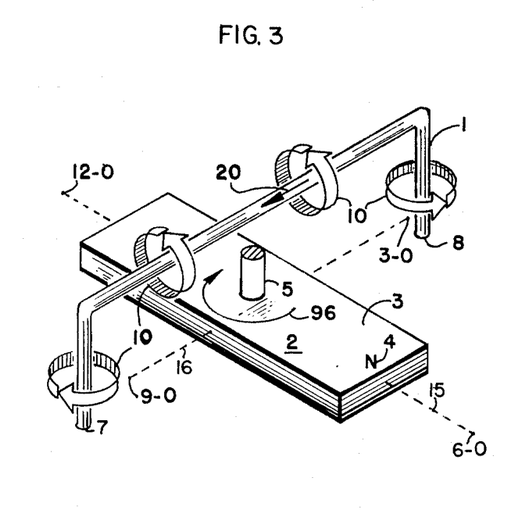
FIG. 3 illustrates another arrangement of the magnetized movable rotor relative to the current-carrier wherein the current-carrier partially encircles the rotor.

Attention is now directed to FIG. 3 of the drawings. The motor of FIG. 3 operates in the same sequence as the motor of FIG. 2, but the driving means 1 is formed such that the magnetic flux of the driving means imparts a torque on three faces of the rotor.

Figure 4:
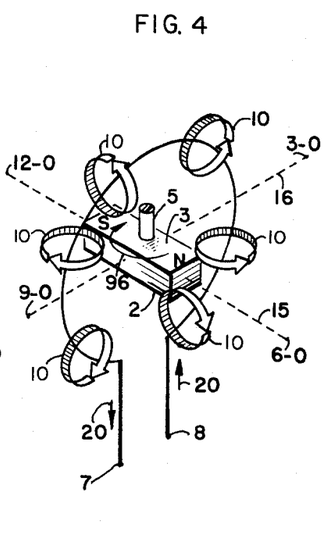
FIG. 4 illustrates still another arrangement of the magnetized movable rotor relative to the current-carrier wherein the current-carrier encircles the rotor.

Attention is now directed to FIG. 4 of the drawings. The motor of FIG. 4 operates in the same sequence as the motor of FIG. 2, but the driving means 1 is formed such that the rotor is encircled by the driving means and the magnetic flux of the driving means completely surrounds the rotor 2 imparting a torque thereto.

Figure 5:
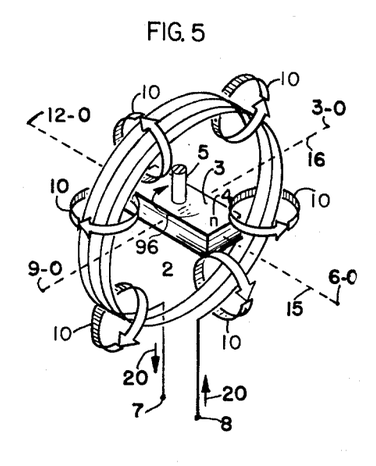
FIG. 5 illustrates still another arrangement of the magnetized movable rotor relative to the current-carrier wherein the current-carrier encircles the rotor with a series of loops thereby forming a helix or solenoid around the rotor.

FIG. 5 of the drawings show how current-carrying loops of the driving means form a helix or solenoid, and the magnetic field of such energized solenoid passes through the inside of the solenoid, out one end, and continues back around and enters the opposite end of the solenoid. The motor of FIG. 5 operates in the same sequence as the motor of FIG. 2.

FIGS. 6, 7, 8, and 9 illustrate various circuits, or means, for selectively energizing the driving means, wherein the rotor 2, battery 22, and semi-conductor 18 are numbered the same as those parts that have the same functions for the motor previously described in FIG. 1.

Figure 6:
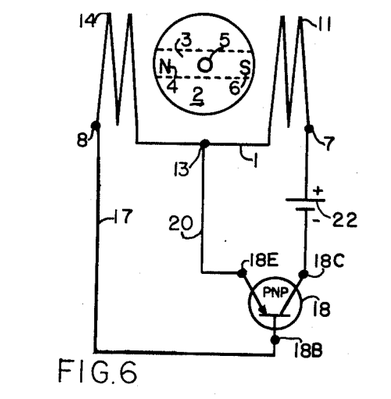
FIG. 6 illustrates schematically an alternate circuit arrangement of the form of the invention shown in FIG. 1, but utilizing only one semi-conductor.

One modification of the motor is illustrated in FIG. 6 wherein the driving means 1 is a center tapped coil with one side of this coil illustrated at 14 and termed the driving means "signal coil," or means, and the other side of this coil illustrated at 11 and termed the driving means "power coil." Center tapped coil 1 encircles the rotor 2. From the above discussions and illustrations, one can easily understand that when the rotor 2 is not in motion, or is stationary, the semi-conductor is not normally conductive and the circuit is open with no current flow therein; however, the rotation of rotor 2 will generate alternate current in signal coil 14, consequently impressing alternate electrical signals at terminal 18B, causing transistor 18 to be alternately conductive and non-conductive, and thereby alternately permitting current flow through power coil 11. Therefore, if the rotor 2 be initially rotated causing the signal coil 14 to impress, through conductor 17, on base terminal 18B a more negative voltage than on emitter terminal 18E, the transistor 18 will become conductive for this period of the cycle and will allow a current flow from the battery through the power coil 11, out center tap terminal 13, through conductor 20, and through the transistor back to the battery. The loops of signal coil 14 and power coil 11 are in such direction relative to the rotor that when the rotor 2 causes the signal coil 14 to cause transistor 18 to allow a current flow through power coil 11, the current flow through power coil 11 is in such direction that the magnetic flux of the power coil imparts a torque on the rotor in the proper direction.

To further demonstrate the operation of the motor of FIG. 6, attention is directed back to FIG. 1. If the battery 21, conductor 24, and transistor 19 be removed from the circuit of FIG. 1, it can be seen that the remaining motor and circuit is the same with the same numbered components as the motor of FIG. 6 and that the motor of FIG. 6 as thus illustrated in FIG. 1 will operate in the following manner.

If the rotor 2 is initially rotated in a clockwise direction 96 with the north pole 4 starting from the 6 o'clock position 6–0 and proceeding toward positions 9–0 and 12–0 respectively, terminal 8 of signal coil 14 is impressed with a more negative voltage and this voltage state is conducted through conductor 17 to terminal 18B of transistor 18. The windings of signal coil 14, which is one side of center tapped coil 1, are such that this negative voltage impressed on terminal 18B is more negative than terminal 18C, thereby causing transistor 18 to become conductive.

For this first 180° of rotation, wherein the north pole 4 of the rotor rotates in a clockwise direction from point 6–0 through point 9–0 and to point 12–0 and/or the south pole 6 rotates from point 12–0 through point 3–0 and to point 6–0, and whereby transistor 18 is caused to be conductive, current is allowed to flow from battery 22 through conductor 23 to terminal 7, through power coil 11 and out terminal 13, through conductor 20 to the transistor emitter 18E, through transistor 18 and conductor 25 and back to the battery 22. The magnetic field created inside of power coil 11 (which is one side of center tapped coil 1) by this current flow is such that a clockwise torque is imparted to the rotor.

For the second 180° of rotation, wherein the north pole 4 of the rotor rotates in a clockwise direction from point 12–0 through point 3–0 and to point 6–0 and/or the south pole 6 rotates from point 6–0 through point 9–0 and to point 12–0, a more positive voltage is impressed on terminal 8 and consequently also on terminal 18B, thereby causing transistor 18 to be non-conductive and breaking the current flow and magnetic flux of power coil 11. Due to inertia, the rotor 2 rotates through this second 180° of rotation until the first 180° of rotation again starts and thereafter the cycles continue to repeat in the sequence described above.

It can thus be seen that the electric signals received at terminal 8 of coil 14 of FIG. 6 and transmitted to terminal 18B cause transistor 18 to be selectively conductive and non-conductive and therefore selectively allows a current flow through the power coil 11 which accordingly selectively imparts a torque on the rotor 2 in the desired direction. The motor of FIG. 6 will operate equally well in a clockwise or counter clockwise direction.

Figure 7:
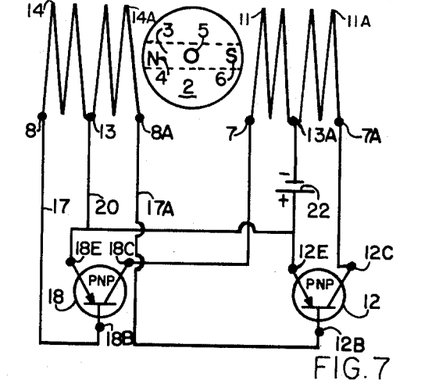
FIG. 7 illustrates another arrangement of the circuit illustrated in FIG. 6, but using more than one semi-conductor.

In FIG. 7, the circuit is similar to that of FIG. 6, but it is modified to include two semi-conductors illustrated as PNP transistors 18 and 12, two power coils illustrated as coils 11 and 11A, and two control coils illustrated as coils 14 and 14A. Because of the double windings of the coils and the two transistors, current is alternately allowed to flow through one of the power coils such that a continuous torque of the desired direction is imparted to the rotor.

It can thus be seen that the motor of FIG. 7 operates in the following manner. The signal coils 14 and 14A are actually a center tapped coil with ends 8 and 8A and center tap 13. Center tap 13 is connected by conductor 20 to emitters 18E and 12E of transistors 18 and 12 and also connected to the positive terminal of battery 22. The power coils 11 and 11A are actually a center tapped coil with terminals 7, 7A, and 13A, and these terminals are connected to transistor collector 18C, transistor collector 12C, and the negative terminal of battery 22 respectively and as shown in the drawing. The rotating rotor generates alternate current in the signal coils and the electrical value at terminals 8 and 8A is accordingly opposite to each other. When terminal 8 is more negative than terminal 13 thereby causing terminal 18B to be more negative than terminal 18E and transistor 18 to be conductive, a current is allowed to flow from the battery through transistor 18 and power coil 11. When terminal 8A is more negative than terminal 13 thereby causing terminal 12B to be more negative than terminal 12E and transistor 12 to be conductive, a current is allowed to flow from the battery through transistor 12 and power coil 11A. It is noted that the current can flow only in one direction through power coil 11 or power coil 11A. Accordingly, it is noted that the magnetic fields caused by current flow through coils 11 and 11A are opposite to each other. Therefore, it has now been shown that electric signals transmitted by signal coils 14 and 14A, from terminals 8, 13, and 8A to terminals 18B, 18E, 12B, and 12E, selectively cause transistors 18 and 12 to be alternately conductive and non-conductive, and a current is allowed to flow selectively through either power coil 11 or power coil 11A which in turn reverses the magnetic field of the driving coil, causing a continuous torque of the desired direction on the rotor 2.

Figure 8:
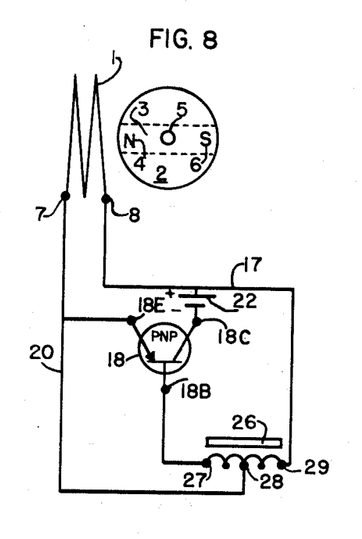
FIG. 8 illustrates still another circuit arrangement of the invention wherein a single driving coil is employed and a semi-conductor with a control transformer is utilized to selectively energize the coil in the proper sequence.

In FIG. 8, an alternate circuit arrangement is utilized wherein only one coil is needed and illustrated at 1 with terminals 7 and 8. The circuit includes a semi-conductor represented as a PNP transistor 18, a battery 22, and a control transformer 26. Control transformer 26 is provided with terminals 27, 28, and 29. Terminal 8 of driving means 1 is connected to the positive terminal of battery 22 and to terminal 29 of the control transformer by conductor 17. Terminal 7 of driving means 1 is connected to emitter terminal 18E of transistor 18 and to terminal 28 of the control transformer by conductor 20. Terminal 27 of the control transformer 26 is connected to base terminal 18B of the transistor 18. The negative terminal of the battery 22 is connected to the collector terminal 18C of the transistor 18. It can be seen that the semi-conductor in the circuit of FIG. 8 is normally non-conductive when the rotor 2 is at rest since terminal 18B is not more negative than terminal 18E. It can also be seen that in rotating, the rotor 2 will generate alternate current in coil 1 and the electrical value of this current at terminal 7 relative to terminal 8 is accordingly opposite to each other. Therefore, if the rotor 2 be initially rotated, and the first 180° of this rotation is such that the current generated in coil 1 by rotating rotor 2 causes terminal 7 to be more negative than terminal 8, a current will flow through conductor 17 to terminal 29 of the control transformer and through half of the control transformer and out terminal 28. The windings of this control transformer are arranged such that this current flow therethrough causes terminal 27 to be more negative than terminal 28 and consequently causes terminal 18B to be more negative than terminal 18E and transistor 18 to be conductive. When transistor 18 is conductive, current is allowed to flow through both coil 1 and control transformer 26 and thereby causes a torque of a selective direction to be imparted from coil 1 to rotor 2. This torque will be imparted to the rotor for the first 180° of rotation; however, when the second 180° of rotation is commenced, the electromotive force in coil 1 caused thereby also causes terminal 27 to be more positive than terminal 28 and consequently causes transistor 18 to be non-conductive. Due to inertia, the rotor 2 rotates through this second 180° of rotation until the first 180° of rotation again starts and thereafter the cycles continue to repeat in the sequence described above.

It can thus be seen that the electromotive force of coil 1, caused by the rotating rotor 2 of FIG. 8, is transmitted to terminals 18E and 18B in such a way that semi-conductor 18 is caused to be alternately conductive and non-conductive thereby selectively allowing a current flow through coil 1 which accordingly imparts a torque on the rotor 2 in the desired direction. The motor of FIG. 8 will operate equally well in a clockwise or counter clockwise direction.

Figure 9:
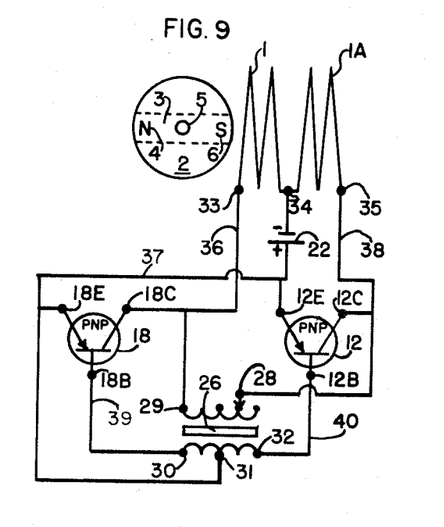
FIG. 9 illustrates still another circuit arrangement of the invention wherein a center tapped driving coil is employed and more than one semi-conductor is utilized with a control transformer to selectively energize the coils in the proper sequence.

The circuit of the motor of FIG. 9 is similar to that of FIG. 8 but is modified to include two semi-conductors illustrated as PNP transistors 18 and 12, a center tapped driving coil illustrated as coils 1 and 1A with terminals 33, 34, and 35, and a control transformer 26 which is provided with terminals 28, 29, 30, 31, and 32. Because of the double windings of the coil, the two transistors and the control transformer, current is alternately allowed to flow through one of the driving coils in such a way that a continuous torque of the desired direction is imparted to the rotor. Terminal 33 of driving means 1 is connected by conductor 36 to collector terminal 18C of the transistor 18 and to terminal 29 of control transformer 26. Terminal 34, which is the center tap of the driving means comprising, in combination, coils 1 and 1A, is connected to the negative terminal battery 22. The positive terminal of battery 22 is connected by conductor 37 to the emitter terminal 12E of transistor 12, to terminal 31 of control transformer 26, and to the emitter terminal 18E of transistor 18. Terminal 35 of coil 1A is connected by conductor 38 to the collector terminal 12C of transistor 12 and to terminal 28 of the control transformer. Terminal 30 of the control transformer is connected by conductor 39 to terminal 18B and terminal 32 is connected by conductor 40 to terminal 12B. It can be seen that transistors 12 and 18 are normally non-conductive when the rotor 2 is at rest since terminals 18B and 12B are not more negative than terminals 18E and 12E respectively. It can also be seen that the rotating rotor generates alternate current in coils 1 and 1A and that this electrical value at terminals 33 and 35 is accordingly opposite to each other. Therefore, if the rotor 2 be initially rotated, and the first 180° of this rotation is such that the current generated in coil 1 by rotating rotor 2 causes terminal 33 to be more positive than terminal 35, a current will flow through conductor 36 to terminal 29 and through the control transformer and out terminal 28. The windings of this control transformer are arranged such that this current flow therethrough causes terminal 30 to be more positive than terminal 32 and consequently terminal 18B to be more positive than terminal 18E making transistor 18 non-conductive and terminal 12B to be more negative than terminal 12E making transistor 12 conductive. When transistor 12 is conductive, current is allowed to flow from the battery 22 through conductor 37, transistor 12, conductor 38, coil 1A, and back to the battery. A torque of selective direction will be imparted from coil 1A to the rotor by this current flow. Current, as described above, is allowed to flow through the control transformer for this first 180° of rotation and accordingly the torque imparted to the rotor by the magnetic field of induced coil 1A will prevail for the first 180° of rotation; however, when the second 180° of rotation is commenced, the electromotive force in coils 1 and 1A caused thereby causes terminal 35 to be more positive than terminal 33 and consequently reverses the direction of current flow through control transformer 26 and the electrical value of terminal 30 relative to terminal 32. The reverse of the value of control transformer 26, caused by this second 180° of rotation, causes transistor 12 to be non-conductive and transistor 18 to be conductive. When transistor 18 is conductive, current is allowed to flow from the battery 22, through conductor 37, transistor 18, conductor 36, coil 1, and back to the battery. The direction of magnetic field of coil 1 is reverse to that direction of coil 1A and therefore the torque of selected direction is now being imparted to the rotor by coil 1. It is noted that the current flow from the battery can flow only in one direction through coils 1 and 1A, and accordingly, as previously stated, the direction of magnetic fields caused by this current flow is opposite to each other.

Therefore, it has now been shown that the electromotive force of coils 1 and 1A, caused by the rotating rotor 2 of FIG. 9, is transmitted to the control transformer in such a way that the control transformer is caused to cause transistors 12 and 18 to be selectively alternately conductive and non-conductive, and therefore, current is allowed to flow from the battery selectively through either coil 1 or coil 1A thereby reversing the magnetic field and causing a continuous torque of a selected direction on rotor 2.

Figure 12:
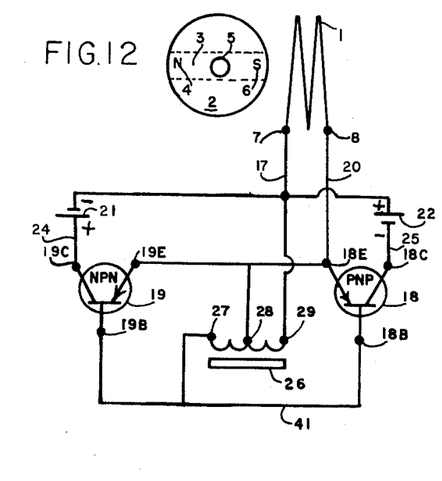
FIG. 12 illustrates still another circuit arrangement of the invention wherein a single current-carrier serves as a joint driving and signalling current-carrier.

The circuit of FIG. 12 is similar to that of FIG. 1 but is modified to replace the control coil with a control transformer whereby a continuous torque can be imparted to the rotor by a single driving current-carrier, and the electromotive force of the current-carrier caused by the rotating rotor is transmitted to the control transformer, and whereby the control transformer selectively causes a selected semi-conductor to be conductive. In FIG. 12, driving current-carrier 1 is provided with terminals 7 and 8; conductor 20 connects the emitters 19E and 18E and terminal 8 of coil 1 and terminal 28 of control transformer 26; the positive terminal of battery 21 is connected to collector 19C by conductor 24; the negative terminal of battery 22 is connected to terminal 18C by conductor 25; terminal 27 of control transformer 26 is connected to bases 18B and 19B by conductor 41; the negative terminal of battery 21 and the positive terminal of battery 22 is connected to terminal 29 of the control transformer 26 and terminal 7 of coil 1 by conductor 17; semi-conductor 18 is being represented by a PNP transistor with terminals 18C, 18E, and 18B; semi-conductor 19 is being represented by a NPN transistor with terminals 19C, 19E, and 19B; the power source being represented by batteries 21 and 22. It can be seen that transistors 18 and 19 are normally non-conductive when rotor 2 is at rest since terminal 18B is not more negative than terminal 18E and terminal 19B is not more positive than 19E. It can also be seen that the rotating rotor generates alternate current in coil 1 and that the electrical value of this current at terminals 7 and 8 is accordingly opposite to each other. Therefore, if the rotor 2 be initially rotated, and the first 180° of this rotation is such that the current generated in coil 1 by rotating rotor 2 causes terminal 8 to be more negative than terminal 7, a current will flow through conductor 17 to control transformer terminal 29, through the control transformer 26 and out terminal 28 of the control transformer. The windings of this transformer are arranged such that this current flow therethrough causes terminal 27 to be more negative than terminal 28 and consequently terminal 18B to be more negative than terminal 18E and transistor 18 to be conductive. When transistor 18 is conductive, current is allowed to flow from battery 22 through conductor 17, coil 1, conductor 20, transistor 18, and conductor 25, back to battery 22. A torque of selective direction will be imparted from coil 1 to the rotor by this current flow. Current, as described above, is allowed to flow through the control transformer for this first 180° of rotation and accordingly the torque imparted to the rotor by the magnetic field of energized coil 1 will prevail for the first 180° of rotation; however, when the second 180° of rotation is commenced, the electromotive force in coil 1 caused thereby, causes terminal 8 to be more positive than terminal 7 and consequently reverses the direction of current flow through control transformer 26 and the electrical value of terminal 27 relative to terminal 28. The reverse of the value of control transformer 26, caused by this second 180° of rotation, causes transistor 18 to be non-conductive and transistor 19 to be conductive. When transistor 19 is conductive, current is allowed to flow from the battery 21 through conductor 24, transistor 19, conductor 20, coil 1, and through conductor 17 back to battery 21. It is noted that the current flow through coil 1 for this second 180° of rotation as allowed by transistor 19 being conductive is in reverse to the current flow allowed by transistor 18, and accordingly the magnetic field is reversed and the torque of selected direction is still being imparted to the rotor 2 by coil 1 for the second 180° of rotation. It is also noted that the current flow through coil 1 can be selectively reversed by transistors 18 and 19 and therefore a continuous torque of selective direction can be imparted to the rotor by coil 1.

Therefore, it has now been shown in FIG. 12 that the electromotive force of coil 1, caused by the rotating rotor 2, is transmitted to the control transformer in such a way that the control transformer is caused to cause transistors 18 and 19 to be selectively alternately conductive and non-conductive, and therefore current is allowed to flow through coil 1 alternately from battery 21 or 22 thereby reversing the magnetic field of coil 1 and causing a continuous torque of a selected direction on rotor 2.

Figure 13:
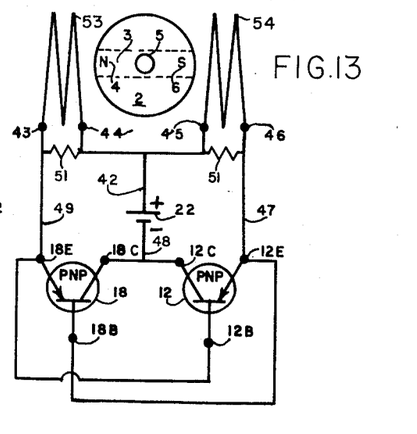
FIG. 13 illustrates still another circuit arrangement of the invention wherein two current-carriers are provided each serving as joint driving and signalling current-carriers.

The circuit of FIG. 13 is similar to that of FIG. 6, but it is modified to include two semi-conductors and two driving current-carriers each serving as a joint signal coil and power coil. In FIG. 13, the two semi-conductors are being represented as two PNP transistors 18 and 12 with terminals 18E, 18C, 18B, 12C, 12E, and 12B respectively; the driving coils 53 and 54 are provided with terminals 43, 44, 45, and 46 respectively; the power source is being represented as a battery 22; conductor 42 connects terminal 44 of coil 53, terminal 45 of coil 54 and the positive terminal of battery 22; conductor 47 connects terminal 46 of coil 54, emitter terminal 12E of transistor 12, and base terminal 18B of transistor 18; conductor 49 connects terminal 43 of coil 53, emitter terminal 18E of transistor 18, and base terminal 12B of transistor 12; conductor 48 connects the negative terminal of battery 22 to the collector terminal 18C of transistor 18 and the collector terminal 12C of transistor 12; the rotor 2 is provided with shaft 5, and is magnetized along the dimetrical band 3 with north pole 4 and south pole 6. Transistors 12 and 18 are normally non-conductive when the rotor 2 is at rest since the bases 18B and 12B are not more negative than the emitters 18E and 12E. However, if the rotor 2 be initially rotated, and the first 180° of this rotation is such that the current generated in coil 53 causes terminal 43 to be more negative than terminal 44, this electrical value is transmitted by conductor 49 to terminal 12B and transistor 12 is caused to be conductive. When transistor 12 is conductive, current will flow from battery 22, through conductor 42, coil 54, conductor 47, transistor 12, and conductor 48 back to the battery 22. A torque of selective direction will be imparted from coil 54 to the rotor by this current flow. Current, as described above, is allowed to flow through coil 54 for this first 180° of rotation and accordingly the torque imparted to the rotor by the magnetic field of energized coil 54 will prevail for the first 180° of rotation; however, when the second 180° of rotation is commenced, the electrical polarity at terminals 43 and 44 of coil 53 is reversed, and transistor 12 is caused to be non-conductive thereby breaking the above described current flow through coil 54. This second 180° of rotation causes terminal 46 to be more negative than terminal 45 and this negative value is transmitted through conductor 47 to terminal 18B causing transistor 18 to be conductive. When transistor 18 is conductive, a current is allowed to flow from battery 22 through conductor 42, coil 53, conductor 49, transistor 18, and conductor 48 back to battery 22. The magnetic field caused by this current flow through coil 53 for this second 180° of rotation is in reverse to that magnetic field of coil 54 for the first 180° of rotation, and accordingly, a torque of selected direction is still being imparted to the rotor 2 by coil 53 for the second 180° of rotation. The rotor then continues to rotate in the above described sequence.

Figure 14:
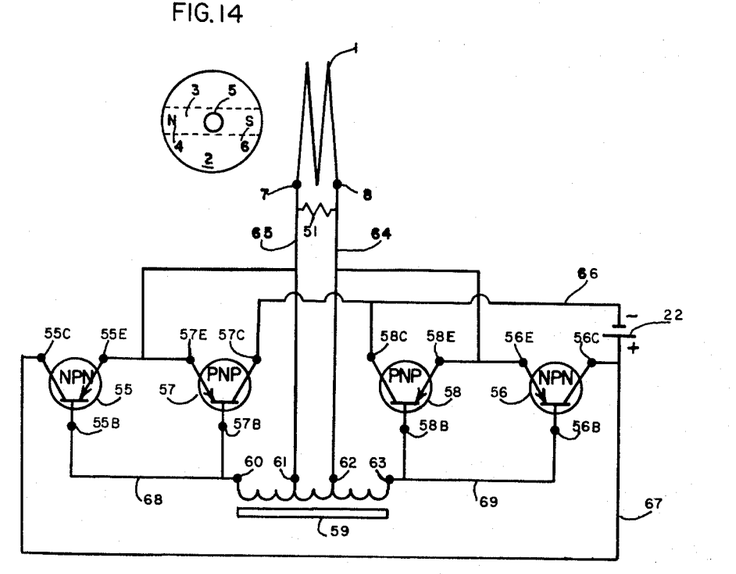
FIG. 14 illustrates still another circuit arrangement of the invention wherein a single current-carrier together with a control transformer and four transistors are provided to impart a continuous torque on the rotating rotor.

FIG. 14 represents another modification of the invention wherein a single driving current-carrier and a single power source, together with the circuit as shown, maintains a continuous torque on the rotor 2. The components of FIG. 14 include the following:

Battery 22
NPN transistor 55 with terminals 55B, 55C, and 55E
NPN transistor 56 with terminals 56B, 56C, and 56E
PNP transistor 57 with terminals 57B, 57C, and 57E
PNP transistor 58 with terminals 58B, 58C, and 58E
Control transformer 59 with terminals 60, 61, 62, and 63
Driving current-carrier 1 with terminals 7 and 8
Conductor 65 which connects terminals 7, 61, 57E, and 55E
Conductor 64 which connects terminals 8, 62, 56E, and 58E
Conductor 69 which connects terminals 58B, 56B, and 63
Conductor 68 which connects terminals 60, 55B, and 57B
Conductor 66 which connects terminals 57C, 58C, and the negative terminal of battery 22
Conductor 67 which connects terminals 55C, 56C, and the positive terminal of battery 22
Rotor 2 with shaft 5, north pole 4, and south pole 6.

Semi-conductors 57 and 58 are being represented as PNP transistors that are not conductive unless the base terminals are more negative than the emitter terminals. Semi-conductors 55 and 56 are being represented as NPN transistors that are not conductive unless the base terminals are more positive than the emitter terminals. Therefore, with the rotor 2 at rest, the transistors in the circuit of FIG. 14 are normal non-conductive and there is no current flow from the battery 22.

The motor of FIG. 14 works in the following sequence. If the rotor 2 be initially rotated, and the first 180° of this rotation is such that the current generated in coil 1 causes terminal 7 to be more negative than terminal 8, a current will flow through conductor 64 to terminal 62 of control transformer 59, through part of the control transformer and out terminal 61 to conductor 65. The windings of control transformer 59 are such that this current flow causes terminal 60 to be more negative than terminal 61 and terminal 63 to be more positive than terminal 62. The more negative value of terminal 60 relative to terminal 61 causes PNP transistor 57 to be conductive and NPN transistor 55 to be non-conductive. The more positive value of terminal 63 relative to terminal 62 causes NPN transistor 56 to be conductive and PNP transistor 58 to be non-conductive. With this first 180° of rotation, with transistors 56 and 57 conductive, a current is allowed to flow from battery 22 through conductor 67, transistor 56, conductor 64, coil 1, conductor 65, transistor 57, and conductor 66 back to the negative terminal of the battery. A torque of selective direction will be imparted by the magnetic field of energized coil 1 to the rotor 2 by this current flow. Current will flow through the control transformer 59 and coil 1 as described above for this first 180° of rotation and accordingly the torque imparted to the rotor by the energized coil will prevail for this first 180° of rotation; however, when the second 180° of rotation is commenced, the electromotive force in coil 1 induced by the rotating rotor is of opposite polarity to that of the first 180° of rotation, and this polarity is such that the current flow through transformer 59 is then reversed and consequently the polarity of terminals 63 and 60 is also reversed. For this second 180° of rotation of the rotor and with the polarity of terminals 60 and 63 reversed to that polarity described above for the first 180° of rotation of the rotor, transistors 56 and 57 are non-conductive and transistors 55 and 58 are conductive. When transistors 55 and 58 are conductive, a current is allowed to flow from battery 22 through conductor 67, transistor 55, conductor 65, coil 1, conductor 64, transistor 58, and conductor 66 back to the negative terminal of the battery. It is noted that the direction of current flow through coil 1 for this second 180° of rotation of the rotor is in reverse to that of the first 180° of rotation of the rotor. Consequently, the magnetic field of energized coil 1 is also reversed and the torque of selected direction is still imparted from the coil to the rotor for this second 180° of rotation. The rotor then continues to rotate in the above described sequence.

It is noted that a magnetic field is built up about the driving current-carrier and that this magnetic field is allowed to collapse. It has been found that the collapsing of this magnetic field is sometimes undesirable and sometimes of such magnitude as to be damaging to various components, such as transistors, of the circuit. To control and/or limit the collapsing of the magnetic field of the driving current-carrier, a resistor, being represented at 51 in FIGS. 13 and 14, is added across the driving coil. To simplify the presentation of the various other circuit illustrations, this resistor was not shown on the drawings; however, if it is desired to have this advantage, resistor 51 should be added across terminals 7 and 13 of FIG. 1, terminals 7 and 13 of FIG. 6, terminals 7 and 7A of FIG. 7, terminals 7 and 8 of FIG. 8, terminals 33 and 35 of FIG. 9, and terminals 7 and 8 of FIG. 12. Of course, the resistor 51 could be a variable resistor to determine the desired resistance across the driving coil.

Figure 10:
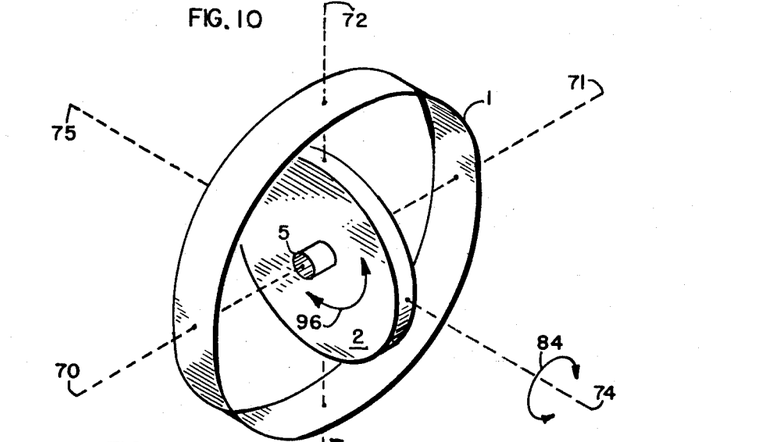
FIG. 10 illustrates the rotor encircled by a stationary coil and more particularly it illustrates the various planes of movement of the rotor relative to the coil.

Attention is now directed to FIG. 10 of the drawings which is an illustration of the various possible planes of movement of the rotor relative to the driving current-carrier simultaneously with the rotation of the rotor. In FIG. 10, the rotor is provided with shaft 5 and is encircled by the current-carrier which is being represented as coil 1. It is intended that coil 1 be stationary relative to a housing and/or structure but such housing and/or structure is not shown in FIG. 1, it being contemplated that suitable structure, as necessary, could be provided to support or house the coil 1. For purposes of illustration, the dashed lines are intended to be stationary relative to the coil and the earth and are referred to as their attitude relative to the surface of the earth. Line 70—71 is parallel to the surface of the earth, is the centerline of the rotational axis of shaft 5, and bisects the center point of coil 1. Line 74—75 is perpendicular to line 70—71, bisects the center point of coil 1, and is also parallel to the surface of the earth. Line 72—73 is perpendicular to the surface of the earth, bisects the center point of coil 1, and accordingly, it is perpendicular to lines 74—75 and 70—71. The rotor 2 and the coil 1 have a common center point, and this point is the intersection of lines 70—71, 74—75, and 72—73. It is intended that the rotor 2 have full freedom to pivot in all planes about the common center point. The mounting for the rotatable rotor 2 is not shown in FIG. 10, it being contemplated that suitable bearings, gimbals, and mounting structures could be provided, as necessary, to allow the free simultaneous rotation about the axis of shaft 5 and pivoting of shaft 5 about the center point of the coil in all planes relative to the coil. It has been previously shown that coil 1 of FIG. 10 can be selectively energized with selective polarity and that the magnetic field of such energized coil will proceed directly from the coil to the rotor imparting a torque to the rotor. Thus the rotor 2 can be caused to rotate about the axis of shaft 5 in either selected direction as indicated by arrows 96. If the shaft 5 be pivoted about line 74—75 in either direction as indicated by arrows 84, while the rotor is rotating, it can be seen that the torque imparted to the rotor by the magnetic field of coil 1 is not affected.

If the axis of shaft 5 be pivoted in a direction toward center line 74—75, as indicated by arrows 85, a torque will still be imparted from the coil to the rotor. A torque will continue to be imparted from the coil to the rotor for any interim position of the axis of shaft 5 between line 70—71, 72—73, and 74—75 except the one position of the rotor wherein the path of the periphery face of the rotating rotor is parallel to the coil windings. It has been previously shown that the magnetic field of a current-carrier is perpendicular to the direction of current through the current-carrier and, therefore, in the dead center position of the rotor wherein the path of the rotor pole face is always parallel to the direction of the windings and the current flow, a torque will not be imparted to the rotor; however, the rotor will not stop rotating when the shaft 5 is pivoted from one plane past dead center of the coil and to a different plane on the opposite side of dead center. More than one coil can be provided for the motor of FIG. 10 and thus the rotor will always be off center of one of the coils and a torque will be imparted to the rotor regardless of its rotational plane.

Figure 11:
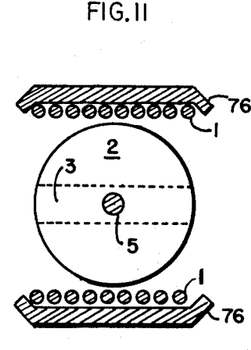
FIG. 11 illustrates another modification of the invention wherein the current-carrier is encircled by a magnetic conductor to help direct the magnetic flux from the outside of the coil to the inside of the coil and to the rotor face.

Attention is directed to FIG. 11 of the drawings which is provided to illustrate one modification of housing the coil. In FIG. 11, rotor 2 is provided with shaft 5, is magnetized along dimetrical band 3, and is encircled by the driving current-carrier coil 1, which, as illustrated, is shown as a cross section of the coil. A cross section of the coil housing is shown as 76. One of the main objects of the present invention has been to provide a brushless D.C. motor with the magnetic field of a driving current-carrier proceeding directly from the current-carrier to the rotor to rotate the rotor. In FIG. 11, it can be seen that this object is accomplished wherein the magnetic field of coil 1 proceeds directly to rotor 2; however, the housing 76 is a magnetic conductor and is provided to help direct that portion of the magnetic field of coil 1 that is not adjacent to the rotor 2. It has been found that, for some applications, that portion of the magnetic field of coil 1 that is not adjacent to the rotor is undesirable and that by providing housing 76, a magnetic conductor of temporary magnetic material, such as soft iron, this portion of the magnetic field may be suitably directed and restricted. It has also been found, that with some applications of this invention, the addition of magnetic conductor 76 improves the efficiency of the motor.

Figure 15:
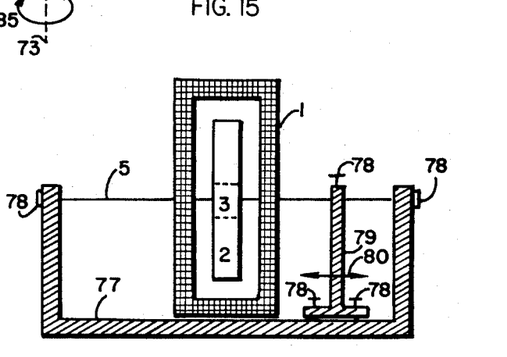
FIG. 15 schematically illustrates an oscillating motor utilizing a torsion bar shaft.

FIG. 15 is a schematic drawing illustrating an oscillating rotational commutatorless D.C. motor encircled by the driving current-carrier such that the magnetic field of the current-carrier proceeds directly from the current-carrier to the rotor and imparts a torque to the rotor member. In FIG. 15, the rotor 2 is permanently magnetized along dimetrical band 3; the current-carrier 1 is illustrated as being a coil and encircles the rotor as shown; the rotor is mounted on shaft 5 which is a torsion bar; structure 77 is provided for supporting the components therewith; guide 79 is adjustable as indicated by arrows 80 and is provided to adjust the stress value of torsion bar 5; clamps 78 are provided to maintain the position and tension of torsion bar 5 relative to guide 79 and structure 77. It is intended that the position of rotor 2 shown in FIG. 15 is illustrative of the rest position of the rotor in which the torsion bar 5 is unstressed. If the rotor be initially rotated in a first direction from this rest position, and if the coil be simultaneously energized to impart a torque to the rotor in that same direction, the rotor will rotate and stress the torsion bar 5 until the force of the stressed torsion bar counterbalances the magnetic torque force imparted by the energized coil. When the forces balance, the rotation stops, and accordingly, the current ceases in the induced coil and the rotor is caused to commence rotating in the opposite direction by the stressed torsion bar. If a circuit of the invention is selected such that the magnetic force is imparted to the rotor for one-half cycle, such as that circuit illustrated in FIG. 6, the rotor will oscillate about torsion bar 5 with magnetic force being imparted to the rotor 2 for one-half cycle and with inertia effects and the stressed torsion bar completing the oscillating cycle and starting the next sequence. If a circuit such as FIG. 1 is selected to operate with the oscillator of FIG. 15, a torque will be imparted to the rotor for both directions of rotation about the torsion bar 5. Adjustment of the guide 79 will change the stress value of the torsion bar 5 and will increase or decrease accordingly the frequency of oscillations.

Figure 16:
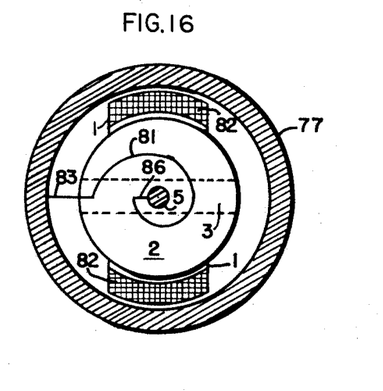
FIG. 16 schematically illustrates an oscillating motor utilizing a coil spring to resist rotational movement.

FIG. 16 is a schematic drawing illustrating another modification of an oscillating rotational commutatorless D.C. motor encircled by the driving current-carrier. In FIG. 16, the rotor 2 is permanently magnetized along dimetrical band 3; the current-carrier 1 is illustrated sectionally as being a coil encircling the rotor and is cut at 82 for illustration purposes; the rotor 2 is provided with shaft 5 for rotation therewith; mountings of shaft 5 are not shown; structure 77 is provided for supporting the components therewith; and spring 81 is connected to shaft 5 at 86 and to structure 77 at 83. The spring is provided for the oscillator of FIG. 16 to resist rotational movement of the rotor and to apply a torque on the rotor toward normal rest position. The oscillator of FIG. 16 operates in the same manner and sequence as that of FIG. 15.

Reference is made to the various circuits, such as that illustrated in FIG. 1, wherein a "center-tapped" coil is specified. It is obvious that two coils could replace the "center-tapped" coils specified herein, but "center-tapped" coils were used in these specifications for illustrative purposes and because such coils are very practical in the actual practice of the invention. A "center-tapped" coil is qualified in these specifications as "a single coil that is tapped at some selected mid-point to derive the effect of two coils each with suitable windings."

Reference is made to the various operations of the above described circuits wherein a torque of "selective direction" is being imparted to the rotating rotor by the driving current-carrier. The direction of torque imparted to the rotor by the current-carrier is dependent on the direction of current flow through the current-carrier and the relative position of the magnetic poles of the rotor to the current-carrier. It can be appreciated that the torque can be of "selective direction" since both the direction of current flow and the time period of such current flow relative to the position of the rotor can be predetermined. Since the direction of torque can be of "selective direction," once a definite direction of torque has been selected, such direction would be the "selected direction."

The rotor 2 illustrated herein has been shown with two poles for illustrative purposes. It can be appreciated that infinite arrangements of pole positions and number of poles can be used with this invention. As a matter of interest, it is noted that either a south magnetic or a north magnetic pole can produce an electromotive force of either polarity dependent upon the direction of motion of the magnetic pole relative to the current-carrier. Accordingly, the motor in this invention will operate with a single magnetic pole on the rotor face or with various arrangements of like or unlike poles.

Reference is made to the various circuits, such as FIG. 7, wherein the driving and signalling current-carriers were shown separated for illustrative purposes. It has been found that the motor of this invention will operate satisfactorily with the various coils separated with the proper relative arrangement or together, even together in the same coil form.

It has been discovered that the rotor 2 can be stopped in a predetermined position relative to the driving coil by providing a magnet suitably located in the motor housing. It is also known that if a switch is placed in the motor circuit, transistors are conductive for a short period of time when the switch is at first closed. Therefore, if the rotor is stopped at a predetermined position and the switch is then closed, the motor is self-starting and the direction of rotation can be predetermined. This self-starting feature is particularly adaptable to the circuits illustrated in FIGS. 6 and 8.

Although the circuits herein have been described using transistors, and particularly using PNP transistors, it can be appreciated that NPN transistors, electronic tubes, switches, thyratrons, or other semi-conductors with the ability to function as described herein can be used by substituting or modifying the circuit for the right polarity and function.

It can easily be seen that the circuits shown in this application may be self-oscillating or regenerative circuits. This is particularly so when the driving coils are adjacent to the control coils or the driving and control coils are wound on the same coil form. This inherent characteristic is sometimes undesirable, and it has been discovered that by utilizing a resistor across the driving windings, this undesirable characteristic can be suitably controlled. This resistor could be that same resistor as previously described as resistor 51 in FIG. 14.

The electric motor or oscillator as described hereinabove can also be adapted to use as a transducer or oscillator. To adapt it to such use, it would be necessary only to connect across the terminals of the driving winding for the electrical load.

The motor or oscillator as described hereinabove can also be adapted as a motor generator. To adapt it to such use, it is necessary to add an additional coil adjacent to the rotor so that the rotating rotor will generate an electromotive force therein. This would apply to any of the motors or oscillators as described herein.

Although all of the control coils as described hereinabove have been coils without cores or electrical conductors that were magnetically coupled directly with the rotor, it can be appreciated that these control coils could be coils with magnetic conducting cores without departing from the scope of this invention. This would apply to control coil 14 of FIG. 1 and FIG. 6, and control coils 14 and 14A of FIG. 7.

What is claimed is:

1. An electric motor comprising a rotatably mounted permanently magnetized rotor, an electrical conductor magnetically coupled directly with said rotor to rotate said rotor when selectively energized and to receive electromotive force pulses from said rotating rotor, a power source including at least one transistor for selectively energizing said conductor, and a circuit, including a control transformer, connecting said power source, said transistor, said control transformer, and said electrical conductor in such a way that said transistor is responsive to the electrical polarity of said control transformer and is caused to be conductive with a selected electrical polarity of said control transformer, and the electrical polarity of said control transformer is controlled by said electromotive force pulses induced in said conductor by said rotating rotor and thereby selectively controls said transistor to rotate said rotor.

2. An electric motor comprising:
   (a) an electrical conductor, having an input and output terminal, suitably positioned for generating magnetic flux in selected areas;
   (b) a permanently magnetized rotor suitably mounted for rotation within said areas;
   (c) a transistor
      (1) having an input electrode, an output electrode, and a control electrode,
      (2) including a circuit serially coupling said input and output electrodes with said input and output terminals and a source of electric power;
   (d) and a control transformer having a first and a second winding
      (1) with said first winding serially coupled with said input and output terminals to receive electromotive force pulses induced in said conductor by said rotating rotor
      (2) and said second winding
         magnetically coupled with said first winding and serially coupled with said input and control electrodes
            to control the conductivity of said transistor in a relationship to the polarity of a current induced in said second winding by said first winding.

3. An electric motor comprising:
   (a) a rotatably mounted permanently magnetized rotor;
   (b) an electrical conductor magnetically coupled directly with said rotor
      (1) to generate magnetic flux, when selectively energized, to impart a torque to said rotor and rotate said rotor,
      (2) and to receive electromotive force pulses from said rotating rotor;
   (c) at least one semiconductor, each having a main current carrying path, with an input electrode, an output electrode, and a control electrode to control the conductivity of said path in a relationship to the polarity of a current impressed on said control electrode;
   (d) a circuit, including a source of electric power, serially coupling said input and output electrodes with said conductor and said source of electric power to energize said conductor in a relationship to the conductivity of said current carrying path;
   (e) and a transformer, having a plurality of windings,
      (1) with a first winding coupled with said conductor to be energized in a relationship to current in said conductor,
      (2) and a second winding coupled with said input and control electrodes to control the conductivity of said current carrying path in a relationship to the polarity of a current induced in said second winding by said first winding.

4. An electric motor comprising:
   (a) a rotatably mounted permanently magnetized rotor;
   (b) an electrical conductor, having an input and output terminal, magnetically coupled directly with said rotor
  (1) to rotate said rotor when selectively energized
  (2) and to receive electromotive force pulses from said rotating rotor;
(c) a semiconductor having a main current carrying path with an input electrode, an output electrode, and a control electrode to control the conductivity of said path in a relationship to the polarity of a current impressed on said control electrode;
(d) a circuit, including a source of electric power, serially coupling said input electrode, output electrode, input terminal, output terminal, and said source of electric power, to energize said conductor in a relationship to the conductivity of said current carrying path;
(e) and a transformer, having a first and second winding,
  (1) with said first winding coupled with said input and output terminals to receive said electromotive force pulses induced in said conductor
  (2) and said second winding coupled with said input and control electrodes to control the conductivity of said path in a relationship to the polarity of a current electromagnetically induced in said second winding by said first winding.

5. An electric motor comprising:
(a) a rotatably mounted rotor having permanently magnetized magnetic poles positioned to rotate with said rotor for creating moving magnetic fields in selected areas;
(b) an electrical conductor, suitably positioned within said selected areas and magnetically coupled directly with said rotor
  (1) to rotate said rotor with a magnetic force produced by said conductor when selectively energized,
  (2) and to receive electromotive force pulses induced by said moving magnetic fields;
(c) at least one semiconductor, each having a main current carrying path with an input electrode, an output electrode, and a control electrode to control the conductivity of said path in a relationship to the polarity of a current impressed on said control electrode;
(d) a circuit, including a source of electric power,
  (1) serially coupling said conductor with said input electrode, said output electrode, and source of electric power,
  (2) to energize said conductor in a relationship to the conductivity of said current carrying path;
(e) and a transformer, having a plurality of windings,
  (1) with a first winding coupled with said conductor to be energized with a polarity in a relationship ot the polarity of said conductor,
  (2) and a second winding coupled with said input and control electrodes to control the conductivity of said current carrying path in a relationship to the polarity of a current induced in said second winding by said first winding.

6. An electric device comprising:
(a) a suitably mounted movable member having permanently magnetized magnetic poles positioned to move with said member and create moving magnetic fields in selected areas;
(b) an electrical conductor suitably positioned relative to said selected areas and magnetically coupled with said member
  (1) to move said member with a magnetic force produced by said conductor when selectively energized,
  (2) and to receive electromotive force pulses from said moving magnetic fields;
(c) a semiconductor having a main current carrying path with an input electrode, an output electrode, and a control electrode to control the conductivity of said path in a relationship to the polarity of a current impressed on said control electrode;
(d) a circuit, including a source of electric power, serially coupling said conductor with said input electrode, said output electrode, and said source of electric power, to energize said conductor in a relationship to the conductivity of said current carrying path;
(e) and a transformer, having a first and second winding,
  (1) with said first winding coupled with said conductor to be energized with a polarity in a relationship to the polarity of said conductor,
  (2) and said second winding coupled with said control electrode to control the conductivity of said current carrying path in a relationship to the polarity of a current induced in said second winding by said first winding.

References Cited in the file of this patent

UNITED STATES PATENTS 2,911,578   Reiches _______________ Nov. 3, 1959

FOREIGN PATENTS 746,465   Great Britain __________ Mar. 14, 1956
1,090,564   France _______________ Oct. 20, 1954